L. C. ARNAUD.
FRICTIONAL CHANGE OF SPEED GEARING.
APPLICATION FILED APR. 28, 1910.
1,000,881.
Patented Aug. 15, 1911.
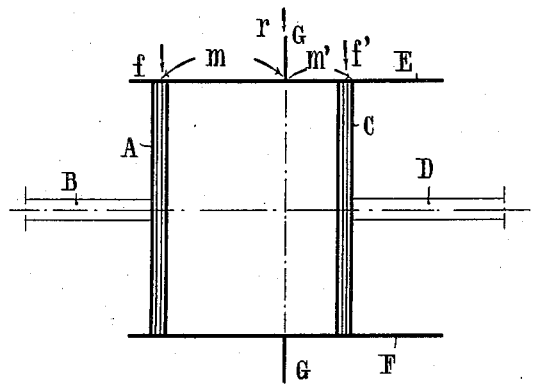
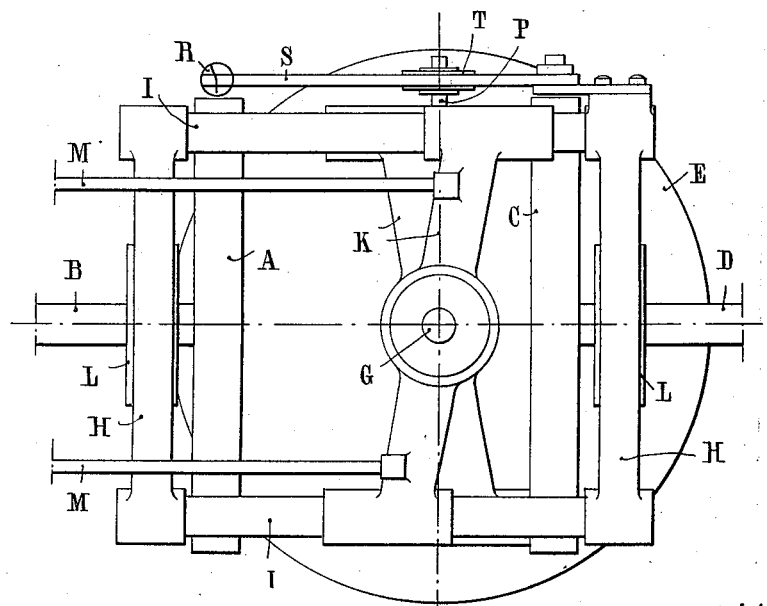
INVENTOR,
LOUIS CAMILLE ARNAUD.

L. C. ARNAUD.
FRICTIONAL CHANGE OF SPEED GEARING.
APPLICATION FILED APR. 28, 1910.

1,000,881.

Patented Aug. 15, 1911.

2 SHEETS—SHEET 2.

WITNESSES:

INVENTOR,
LOUIS CAMILLE ARNAUD,
by
Attorney.

UNITED STATES PATENT OFFICE.

LOUIS CAMILLE ARNAUD, OF FORCALQUIER, FRANCE.

FRICTIONAL CHANGE-OF-SPEED GEARING.

1,000,881.  Specification of Letters Patent.  Patented Aug. 15, 1911.

Application filed April 28, 1910. Serial No. 558,220.

*To all whom it may concern:*

Be it known that I, LOUIS CAMILLE ARNAUD, a citizen of the Republic of France, and residing at Forcalquier, Basses-Alpes, France, have invented certain new and useful Improvements in Frictional Change-of-Speed Gearing, of which the following is a specification.

My invention relates to frictional change-of-speed mechanism.

It relates particularly to a change-of-speed device, in which two friction wheels and two friction disks are employed, and has for its object the automatic insuring of constant adherence between the driving wheels and the disks in a speed-gearing which is variable gradually and continuously.

Figure 2:
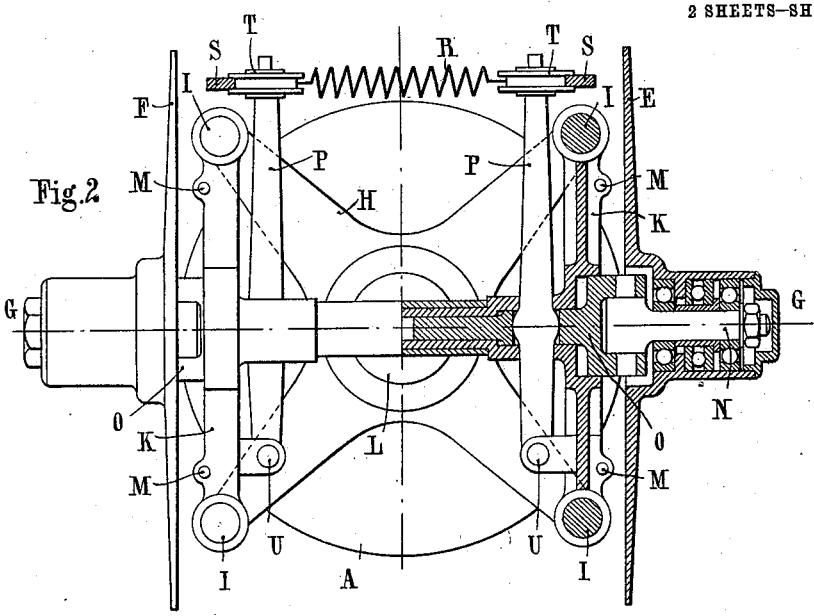
Figure 4:
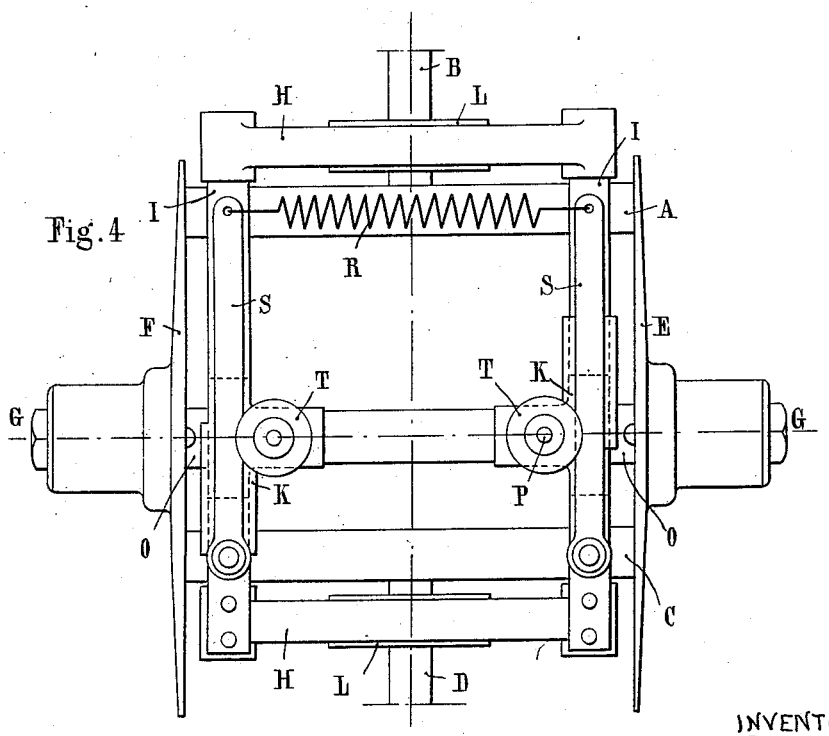

In the drawings attached to and forming a part of this specification: Figure 1 is a diagrammatic view illustrating the principles of the change-of-speed gearing to which the invention relates. Fig. 2 shows at the left the mechanism in a face view, and on the right side, in vertical section. Fig. 3 is a side view in which the front disk is taken off, in order to better show the mechanism. Fig. 4 is a plan view.

Referring to the drawings:—A is a friction wheel mounted on the driving shaft B; C is the driven wheel parallel and equal in diameter to A and mounted on the driven shaft D; E, F are the friction disks; G, G indicate the general direction of the axis of rotation of the disks; H, are cross-pieces of the frame; I transom shafts of the cross-pieces; L are pedestals, and M are rods for manipulating the disks. E and F are mounted loose on the axle journals N adapted to turn in the caps O carried by shafts which slide in tubular members carried by the frame; and it will be seen that when the disks are brought into contact with the friction wheels the driven friction wheel C revolves in the inverse direction to that of the driving wheel A.

Changes from one speed to another are effected by displacing simultaneously the disks E F relatively to the friction wheels A C. We will suppose $r$ (Fig. 1) to be the force which applies the disks E against the wheels A and C. This force $r$ is divided into two other component forces $f$ $f'$ which are inversely proportional to the lever arms $m$ $m'$. Under these conditions as will be seen, when the wheel A engages the disk E close to the periphery of the latter, the force $f$ will be decreased; when, on the contrary, the said disk is engaged near its center, this force $f$ will be increased. Now, in order to insure full efficiency of the speed-mechanism, it is necessary to render this force $f$ constant so as always to apply the disks to good advantage against the friction wheels. The device hereinafter described enables this result to be obtained.

The application of the disks against the wheels is effected by pressing upon the axis of the disks through levers P S. The levers P, mounted vertically, are hinged at U to the oblique parts K; they cross, in a mortise, the tangs of axle-bearing-cap O and are provided, at their upper end, with wheels T which are movable along other levers S, the movable ends of which are connected by the spring R.

The fixed points of the levers S being on the side of the driven friction wheel and the spring on the side of the driving friction wheel, as shown in the drawings, it will be seen that the effort transmitted through the levers to the center of the disks increases gradually as the center of the disks moves away from the driving friction wheel. The adhering pressure exerted by the disks upon the driving friction wheel therefore remains constant, whatever may be the position of the disks.

It should be noticed that the pressure upon the driven friction wheel increases as we pass from a given speed to a less speed.

I do not here claim all the features of my device, the other matters to which I lay claim being set forth in my pending applications, Serial Nos. 558,221 and 558,222; but What I do claim is:

1. In a gradually and continuously variable speed gearing, a pair of friction wheels and a pair of displaceable friction disks, levers parallel to the displacement of the disks, rollers connected with the disks and movable along the levers for applying the disks to the friction wheels, the levers being attached at one end to fixed points, in combination with springs connecting the other ends of said levers.

2. In a variable speed-gearing, a driving shaft, a driven shaft, friction wheels mounted on said shafts, a pair of displaceable friction disks engaging the friction wheels, an axle on which the disks are displaceably mounted, levers, lying parallel to the line of displacement of the axis of the disks, in combination with a second pair of levers at right angles to the first levers and displaceable by their displacement maintaining the pressure constant between friction wheels and disks, whatever may be the position of the disks.

3. In a variable speed-gearing, a driving and a driven friction wheel, driving and driven shafts upon which the wheels are mounted, a pair of displaceable friction disks, axle bearings upon which the disks are displaceably mounted, levers fixedly pivoted on the same side of the disk axis as the driven wheel, a retractile spring attached to the other end of the said levers, in combination with a pair of levers standing at right angles to the first named levers, said second levers being provided with rollers engaging the first named levers and interposed between the latter and the disks.

In testimony whereof I affix my signature in presence of two witnesses.

LOUIS CAMILLE ARNAUD.

Witnesses:
PAUL WHAM,
ALLAN MACFARLAND.

Copies of this patent may be obtained for five cents each, by addressing the "Commissioner of Patents, Washington, D. C."